(12) United States Patent
Clark et al.

(10) Patent No.: US 10,988,065 B2
(45) Date of Patent: Apr. 27, 2021

(54) VEHICLE SEAT

(71) Applicant: Gordon Murray Design Limited, Shalford (GB)

(72) Inventors: Stuart Edward Clark, Crowthorne (GB); Andrew John Smith, Burgess Hill (GB)

(73) Assignee: GORDON MURRAY DESIGN LIMITED, Shalford (GB)

( * ) Notice: Subject to any disclaimer, the term of this patent is extended or adjusted under 35 U.S.C. 154(b) by 59 days.

(21) Appl. No.: 16/301,049

(22) PCT Filed: May 11, 2017

(86) PCT No.: PCT/EP2017/061365
§ 371 (c)(1),
(2) Date: Nov. 13, 2018

(87) PCT Pub. No.: WO2017/194687
PCT Pub. Date: Nov. 16, 2017

(65) Prior Publication Data
US 2019/0184870 A1      Jun. 20, 2019

(30) Foreign Application Priority Data

May 12, 2016   (GB) ..................................... 1608372
Jan. 25, 2017   (GB) ..................................... 1701223

(51) Int. Cl.
*B60N 2/68*      (2006.01)
*B60N 2/64*      (2006.01)
(Continued)

(52) U.S. Cl.
CPC .......... *B60N 2/686* (2013.01); *B60N 2/0705* (2013.01); *B60N 2/1615* (2013.01); *B60N 2/643* (2013.01);
(Continued)

(58) Field of Classification Search
CPC ....... B60N 2/686; B60N 2/682; B60N 2/1615
See application file for complete search history.

(56) References Cited

U.S. PATENT DOCUMENTS 4,509,796 A * 4/1985 Takagi ................. B60N 2/0705
297/452.55
4,781,417 A * 11/1988 Shipman ................ B60N 2/686
297/452.24

(Continued)

FOREIGN PATENT DOCUMENTS

EP       0350458 A1    1/1990
FR       2985468 A1    7/2013
(Continued)

OTHER PUBLICATIONS

International Search Report issued for PCT/EP2017/061365, dated Aug. 8, 2017.
(Continued)

*Primary Examiner* — David R Dunn
*Assistant Examiner* — Tania Abraham
(74) *Attorney, Agent, or Firm* — Westman, Champlin & Koehler, P.A.; Z. Peter Sawicki; Amanda M. Prose

(57) ABSTRACT

A vehicle seat having a vehicle seat base comprising a generally concave seat pan (4) and side plates (16) fixed to the seat pan for mounting the seat pan to the vehicle wherein the seat pan has, all relative to the direction of movement of the vehicle, a front face, a rear face, two lateral side faces and a bottom face, and wherein the side plates extend from the front towards the rear of the seat pan and are bonded to the lateral side faces along at least part of the length of each of the side plates. This produces a lightweight yet rigid seat base which enables a low block height.

14 Claims, 7 Drawing Sheets

(51) Int. Cl.
*B60N 2/16* (2006.01)
*B60N 2/07* (2006.01)
(52) U.S. Cl.
CPC ............ *B60N 2/646* (2013.01); *B60N 2/68* (2013.01); *B60N 2/682* (2013.01)

(56) References Cited

U.S. PATENT DOCUMENTS

| | | | | |
|---|---|---|---|---|
| 6,203,091 | B1* | 3/2001 | Kojima | B60N 2/682 |
| | | | | 296/65.05 |
| 8,678,505 | B2* | 3/2014 | Kanda | B60N 2/72 |
| | | | | 297/452.15 |
| 9,022,475 | B2* | 5/2015 | Brncick | B60N 2/643 |
| | | | | 297/284.2 |
| 9,376,044 | B2* | 6/2016 | Fujita | B60N 2/62 |
| 2007/0182229 | A1 | 8/2007 | Maebert | |
| 2017/0129374 | A1* | 5/2017 | Ortiz Hernandez | B60N 2/90 |
| 2017/0267147 | A1* | 9/2017 | Line | B60N 2/686 |

FOREIGN PATENT DOCUMENTS

| | | |
|---|---|---|
| GB | 2218331 A | 11/1989 |
| JP | S60121936 U | 8/1985 |
| JP | S6364839 A | 3/1988 |
| JP | H01145245 A | 6/1989 |
| JP | H0237052 A | 2/1990 |
| JP | H0317931 U | 2/1991 |
| JP | H03122925 U | 12/1991 |
| JP | 2014100941 A | 6/2014 |
| KR | 1020120069165 A | 6/2012 |

OTHER PUBLICATIONS

Written Opinion of the International Searching Authority issued for PCT/EP2017/061365, dated Aug. 8, 2017.
Search Report issued for GB1608372.7, dated Jul. 13, 2016.
Search Report issued for GB1701223.8, dated Feb. 9, 2017.

\* cited by examiner

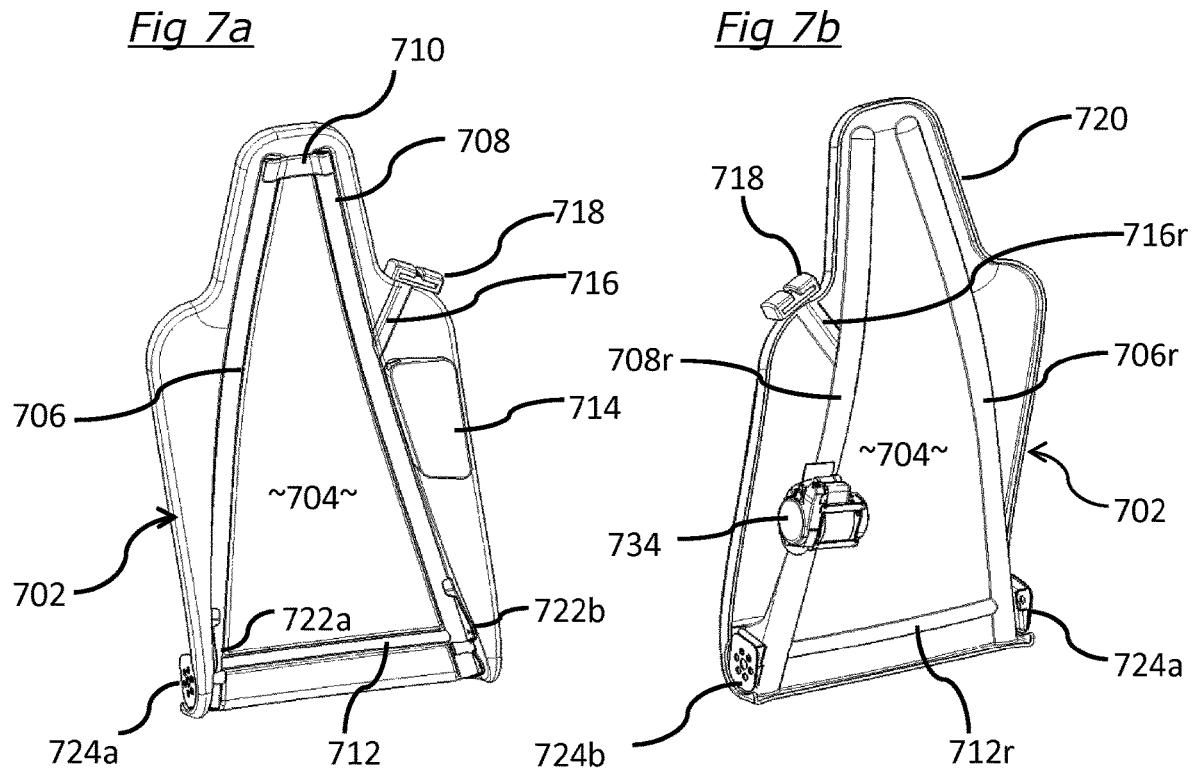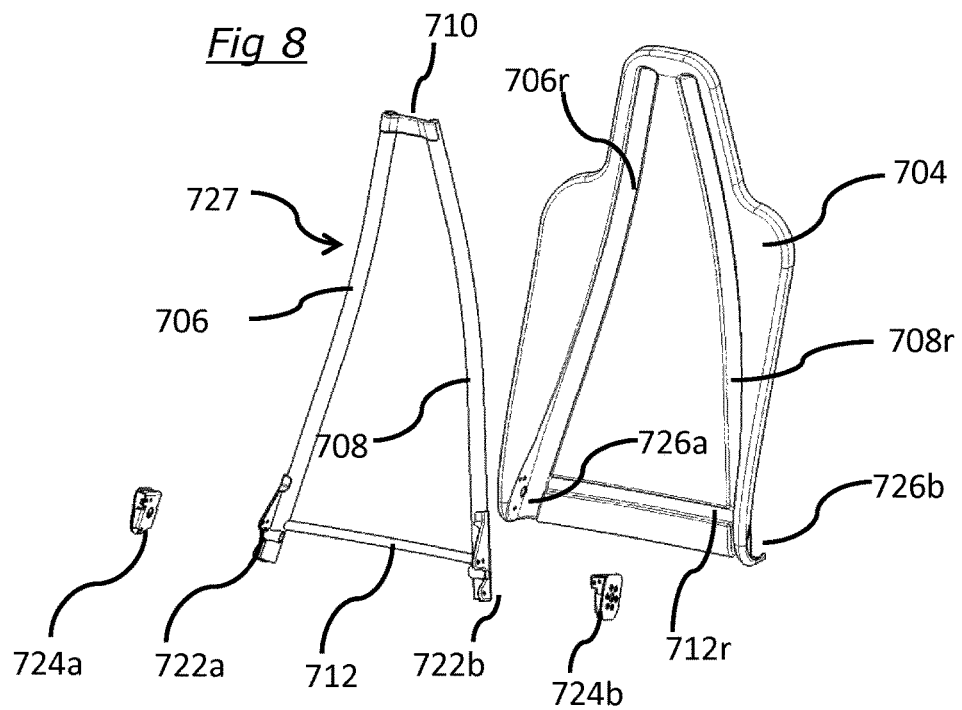

VEHICLE SEAT

This application is a Section 371 National Stage Application of International Application No. PCT/EP2017/061365, filed May 11, 2017, and published as WO2017/194687A1 on Nov. 16, 2017, which claims priority to and benefits of GB Patent Application Serial No. 1701223.8, filed Jan. 25, 2017, and GB Patent Application Serial No. 1608372.7 filed May 12, 2016, the entire contents of which are incorporated herein by reference.

FIELD OF THE INVENTION

The present invention relates to a seat base for a vehicle seat, particularly but not exclusively for a compact city car or sports car.

BACKGROUND ART

Some form of seating is essential for the driver and passengers in a car or other vehicle, to support them in comfort during the journey and restrain them in the event of a collision. There are many different designs for vehicle seats, but they generally consist of a seat base with a seat back mounted thereto. The seat base supports the buttocks and thighs of a person occupying the seat, and the seat back supports the person's back, from the buttocks to the shoulders, or to the back of the head. The seat back can be fixedly mounted to the seat base, in a generally upright position, or it may be pivotally mounted to the seat base, so as to be movable between an upright position and a less upright, or reclined, position. In vehicle seat design and especially automotive seat design, there are often quite demanding constraints on the size and weight of a seat; this is typically a greater challenge in the design of small urban vehicles, such as compact or city cars, as these suffer from a lack of internal space vertically and/or horizontally around the occupants. In addition, vehicle seats have to meet quite exacting regulatory requirements to resist point and impact loads for crash testing, whiplash, luggage strike, etc., which means that a seat must have appropriate characteristics of strength, rigidity and so on.

Nowadays the design of most compact cars deliberately seats a passenger relatively high (compared to saloon or hatchback cars, for example) to ensure that a seated passenger's lower legs are inclined closer to the vertical, thus taking up a shorter horizontal distance and enabling the overall length of the vehicle to be reduced. Such a high seating arrangement can offer advantages in passenger comfort and also better visibility of traffic outside the vehicle, but it also obviously has an effect on the overall height of the vehicle. In order to maximise available space to package vehicle componentry e.g. a battery or fuel tank it is important to minimise the 'block height'. Block height relates to the height or thickness of the passenger seat base; more particularly block height means the height of the 'H-point' (or hip-point, the centre of rotation of a person's hip viewed from the side), which is the vertical location of an occupant's hip, specifically the pivot point between the torso and upper leg portions of the body, relative to the fixed vehicle surface to which the seat base is mounted (some define the block height differently, such as relative to the vehicle floor, or to the height above the level of the road, but in this application we use the definition specifically recited above). Many different seat designs have been produced which attempt to reduce block height, but there is a continuing need for a seat which allows block height to be reduced further, whilst still offering the passenger the seat comfort and adjustability (i.e. ability to slide the seat forwards and rearwards, to recline the seat and to raise or lower the seat so as to optimise passenger comfort) which he/she expects, and whilst still meeting all regulatory requirements. In addition, vehicle seats should be as light in weight and as easy and inexpensive to manufacture with a low capital expenditure as possible, and should preferably be capable of being recycled at the end of their useful life.

JP 2014100941A and JP-0317931 disclose metal seat pans with side plates that can be welded to the pan.

SUMMARY OF THE INVENTION

A seat base which offered a combination of light weight, small thickness, ease and reduced cost of manufacture, minimal material consumption and use of recycled and recyclable materials, while also being designed to pass crash testing and other regulatory requirements, would be highly desirable.

The present invention therefore provides a vehicle seat base comprising a generally concave seat pan and side plates bonded to the seat pan for mounting the seat pan to the vehicle wherein the seat pan has (all relative to the direction of movement of the vehicle) a front face, a rear face, two lateral side faces and a bottom face, and wherein the side plates extend from the front towards the rear of the seat pan and the bond extends along at least part of the length of each of the side plates. The word "face" is used in its broadest sense, to mean a section or element, and should not be construed herein as limited to a planar or flat member except where that is explicitly stated below. The front face, rear face and two lateral side faces may all extend generally downwardly towards a bottom face, the front, rear and lateral side faces being at least in part planar and at least in part tapering inwardly and being configured when in use to receive and support together with the bottom face at least a part of the buttocks or the thighs of a person sitting on the seat, the upper edges of the front, rear and lateral side faces together defining a circumferential lip of the seat pan which extends around the circumference of the seat pan, the planar parts extending in the horizontal plane substantially continuously around the circumference of the seat pan beneath the lips. The seat pan may conveniently be formed of a composite material, such as a sheet of composite material, consisting of a first layer such as a fibre reinforced plastics or resinous material wherein the fibre may be a glass, carbon or recycled carbon fibre, a central layer of core material, such as paper or plastics honeycomb or foam, with a final surface layer of a material such as a fibre reinforced plastics or resinous material wherein the fibre may be a glass, carbon or recycled carbon fibre. Such an arrangement provides a seat pan which permits a small block height and is of reduced weight compared to traditional pressed metallic seat pan designs, whilst it also retains the ability to implement a seat height adjust capability. The front, rear and lateral side faces of the seat pan, in combination with the side plates, provide stiffness, and can be designed to resist torsional loads, and to transfer loads from the side of the seat on which a height adjust mechanism is provided to the other side of the seat. The side plates (which are preferably of pressed metal) are bonded to a composite seat pan to transfer loads from one side of the seat to the other obviate the need for cross members at the front and rear of the seat pan except where a height adjust mechanism is incorporated into the design wherein a front cross member may be required.

The term "bonding" should be construed as encompassing both an adhesive material between the side plates and the side faces, and also the technique of overmoulding, which is known in the art as a technique whereby the composite side faces are moulded over/around part of the side plate so that it becomes integral with the moulded part on cooling; using bonding in this manner means the side plate provides significant stiffening reinforcement to the side face and to the seat pan as a whole.

Bonding is advantageous, because it obviates the need for any fixtures to attach the seat pan and side plate together, such as bolts, screws or the like, which pierce the composite panel and become the focus of point loads which weaken the panel and can form the origin of stress fractures in the seat pan. One solution to the point load situation is to encase a metallic reinforcing element into the side of the seat pan to allow bolts or screws to pass through it whilst spreading the load. However, compared to bonding, there are significant disadvantages to this solution in that it adds weight to the seat and considerable complexity and thus cost to the manufacturing process.

The bonding preferably extends over at least 50% of the length of the side plates to provide sufficient reinforcement (it will be appreciated that increasing the bonded area increases the strength of the complete structure).

Unlike in the present invention, conventional seat designs generally require at least a rear cross member to provide sufficient structural strength to support the occupant and may contribute to the seat obtaining regulatory approval. For conventional seats with height adjust both front and rear cross members are required. However, the rear cross member especially, significantly limits the amount by which the overall height of the seat base, and hence the block height, can be reduced (as will be explained further below, with reference to the drawings).

The extent by which the faces extend in a vertical direction (when the seat base is installed in a vehicle and in use) contributes significantly to the torsional stiffness and strength of the seat pan. The seat pan is preferably configured when in use to receive and support within the seat pan and within the circumferential lip at least a part of the buttocks and at least part of the thighs of a person sitting on the seat, and wherein the rear, front and side faces extend from the lip towards the bottom face. Advantageously the wall section may extend substantially uninterruptedly around the circumference of the seat pan.

Each side plate can include at least one fixture for a pivoting link of a height adjust mechanism, and the rear, front and lateral side faces may extend so that in use substantially all of the lip is vertically above the fixtures and the bottom face is vertically below the fixtures. There may be fixtures on each side plate for mounting the side plates directly or indirectly to the vehicle and located forwardly of and the same distance from the rear face of the seat pan, and between the rear face of the seat pan and the front face of the seat pan, and the space within the seat pan extending directly between the said fixtures may in use be substantially unobstructed by any seat structure e.g. rear support tube as used conventionally. This allows the block height to be reduced to a minimum, and also the length of the seat base (in the forward direction, i.e. the direction of forward movement of the vehicle) to be further reduced; together, these help reduce the overall size of the vehicle.

There may be a planar portion of the wall section extending between the side plates at the rear of the seat pan. This planar portion provides stiffness between the rears of the side plates, whilst allowing the buttocks of a person occupying the seat to fit as rearwardly as possible in the seat. Additionally or alternatively there may be one or more planar portions of the wall section extending between the side plates towards the front of the seat; these portions similarly provide stiffness to the seat pan and remove the need for any cross member (which would if present intrude on the seating arrangement and compromise space), they also can be angled so as to provide comfortable support to the backs of the thighs and upper legs of a person occupying the seat. The or each planar portion may extend from the circumferential lip to the bottom face, and thus form the concave seat pan, whilst contributing significantly to the rigidity and strength of the seat pan. At least part of the lateral sides of the seat pan may taper inwardly towards the bottom face of the seat pan; such a design fits with the natural curves of the sides of the buttocks and upper legs, whilst also making space under the circumferential lip of the seat pan which can be used to accommodate seat height adjust and/or slider mechanisms, and/or other items.

Conveniently, the side plates may be bonded to the seat pan at or adjacent the circumferential lip of the pan, at or adjacent its upper lateral edges; this ensures that the seat occupant's weight is borne by the seat pan material in tension. The bonding may be made in the form of an adhesive bond, which is a fast and inexpensive manufacturing process, or by overmoulding, which essentially utilises part of the seat pan material (e.g. resin) itself as an adhesive. The seat pan is preferably formed of a composite material, such as a glass or carbon fibre reinforced, plastics or resinous material, and, if it is also unitary (i.e. formed in a single piece), it can be light in weight, strong, easy to manufacture and recyclable. There may be a first, core material, such as paper, cardboard or foamed plastic, coated on a first side with a second material such as the composite and on the other side with a second composite material. It will be understood that the amounts and disposition of the different materials making up the composite panel can be varied so as to give the requisite strength, rigidity, lightness of weight and compact size; the local thickness of the seat pan may vary, so as to tailor its strength and to minimise thickness in areas where this will further reduce block height—for example making the bottom face as thin as possible will help reduce block height. The seat pan may be provided with apertures so as to reduce weight, provided that these are not so large and/or numerous as to compromise or adversely affect the strength of the seat pan.

If there is a mechanism mounted to the side plates for mounting directly or indirectly to the vehicle and for selectively adjusting the height of the seat base relative to the vehicle, this mechanism may suitably comprise a four link pivoting mechanism. Such mechanisms are very well-known in automotive design however, unlike the vast majority of conventional seat height adjust designs, the mechanism may be arranged to move the seat base between first and second positions in an arcuate manner, the first position being forwards and lower relative to the second position. This is the reverse arrangement compared to most conventional designs, and in use it means that the movement aligns with the typical shape of a vehicle passenger compartment rear bulkhead. It also maximises the space available for the seat, ensuring the seat rails can accommodate more movement, and makes the seat movement more intuitive for the operator as the fully rear position is achieved for all heights at the same rail position without the need to adjust height and then use seat rail movement to move further rearwards, and provides that fewer adjustments are required to achieve an optimum position (i.e. most ergonomically efficient and/ or comfortable). The four link mechanism may be pivotally mounted to two fixtures along each of the side plates, one towards the front and a second toward the rear of the side plate, the second fixture being forward of the rear face of the seat pan, and the space within the seat pan extending directly between the said fixtures being substantially unobstructed by any seat structure. The combination of seat pan configuration and side plates obviates the need for a cross member which is a design constraint restricting the extent to which a compact seat with a low block height can be achieved with conventional designs.

The seat base may comprise a sliding mechanism mounted between the side plates and the vehicle for selectively sliding the seat base forwards or backwards relative to the vehicle, as is well-known. There will also be additional structure to the vehicle seat, including a seat back, and this will be described with reference to the drawings. It will be appreciated that a vehicle seat base in accordance with the invention allows vehicles and vehicle seats to be manufactured which have significant advantages over conventional designs, including lower block height, more compact size and lighter weight yet equal or superior strength characteristics, and which are relatively easy and inexpensive to manufacture and to recycle at the end of their life. Such advantages are desirable and/or appropriate in the context of small urban automotive vehicles, but are equally as applicable in any other contexts where these advantages might be beneficial, such as in other forms of vehicle as trucks, buses and aircraft, for example.

BRIEF DESCRIPTION OF THE DRAWINGS

The invention will now be described by way of example and with reference to the accompanying figures, in which;

FIGS. 7a and 7b are perspective views, from the front and rear respectively, of a seat back;

FIG. 8 is a simplified, exploded view of the seat back of FIG. 7a;

FIG. 9 is a perspective view of a modified version of the seat back of FIG. 7a,

DETAILED DESCRIPTION OF THE EMBODIMENTS

Figure 1A:
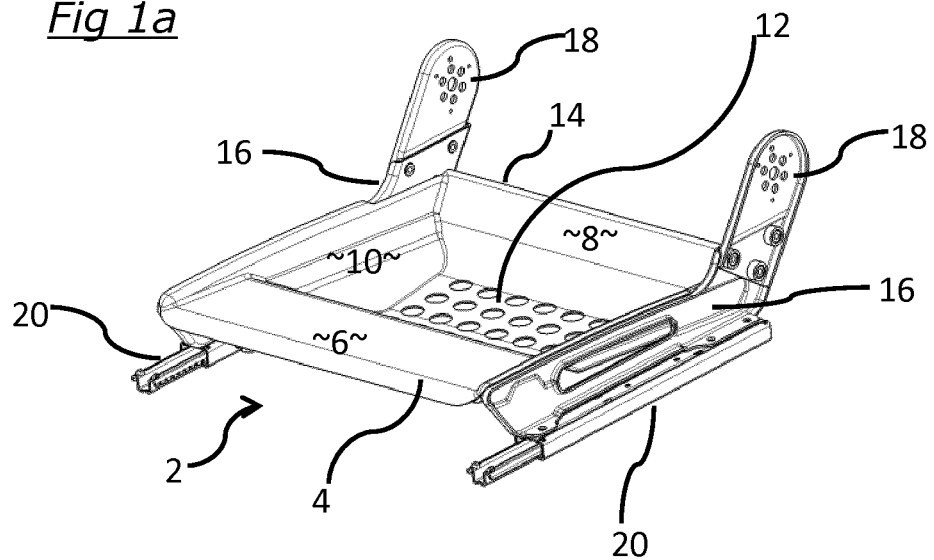
FIG. 1a is a perspective view of a seat base in accordance with the invention having a sliding mechanism.

In the drawings, elements with like reference numerals are generally the same; where an element having the same general function has been modified for some reason, the reference numeral will gain a suffix in the form of an apostrophe. Where an element is intended somehow to complement another element its reference numeral will gain a suffix in the form of an additional letter.

Figure 1B:
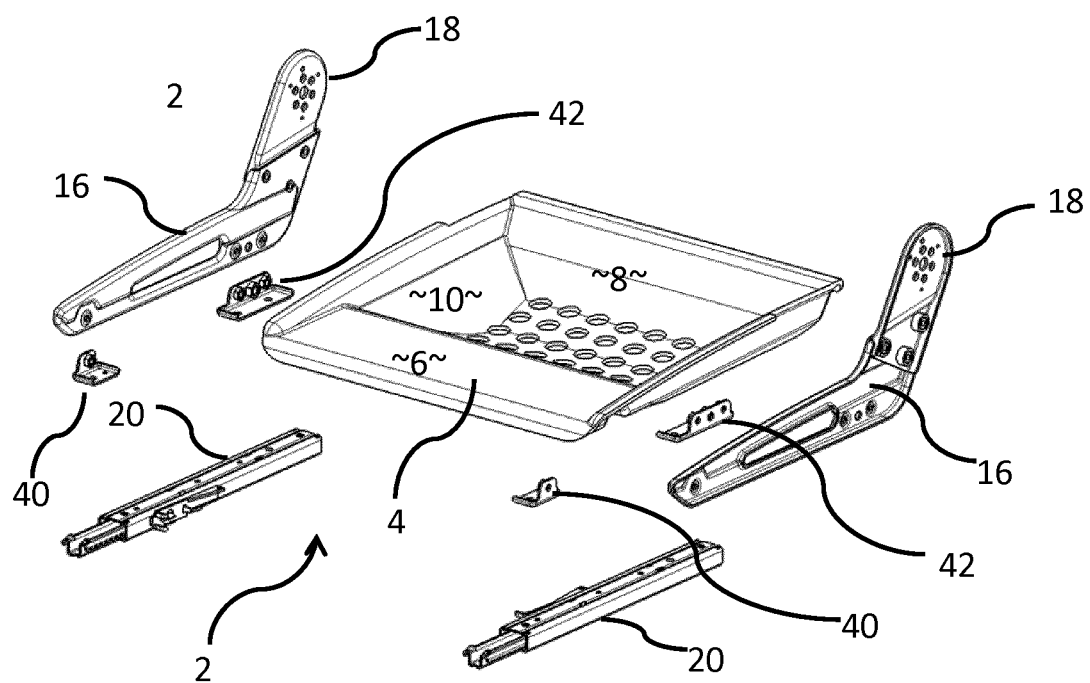
FIG. 1b is an exploded view of this seat base.

FIGS. 1a and 1b show a seat base 2 in accordance with the invention (but without the usual padding, cushioning, upholstery, trim etc. which would be present in a finished seat) which comprises a concave seat pan 4 formed in a single, unitary piece of composite material. The seat pan 4 is defined by generally downwardly extending faces or sections at the front 6, at the rear 8 and at the lateral sides 10, and a generally horizontal bottom face or section 12. The upper edges of the front, rear and side faces 6, 8, 10 define a circumferential lip 14 of the seat pan 4. To the sides of the seat pan 4 are bonded two side metal (steel, aluminium or alloy) plates 16 so as to run generally parallel, and aligned with the direction of forward movement of the vehicle. The side plates have extension plates 18 mounted to them (by bolts, rivets and/or adhesive) for mounting a seat back to the seat base, and the metal side plates 16 and extension plates 18 provide placements for fixtures which will in use generate point loadings (which a composite material is not best able to tolerate). The side plates 16 are also mounted (fixedly by bonding or welding, or releasably by nuts and bolts or the like) to front and rear brackets 40 & 42 which in turn are mounted (fixedly by bonding or welding, or releasably by nuts and bolts or the like) to sliding mechanisms 20 which are mounted to the floor of the vehicle and permit the seat base to be moved forwards or rearwards relative to the vehicle to accommodate different sized passengers in comfort.

It will be noted that the seat pan 4 is formed in a concave, cup shape, which is intended to receive the buttocks and upper thighs of a passenger; the downwardly extending faces 6, 8, 10 extend in a vertical direction to an extent sufficient to provide stiffness and strength to the seat pan, and this is added to by the extent to which these downwardly-extending faces also extend circumferentially around the bottom face 12. The downwardly-extending faces 6, 8, 10 comprise different combinations of surfaces which have different shapes, being generally planar in one direction, and either planar, convex or concave in a second, orthogonal direction, the overall configuration being to taper downwardly and inwardly towards the generally planar bottom face 12. The bottom face 12 has apertures in it which reduce the weight of the seat pan, and which are sized and located so as not to overly reduce the strength of the seat pan structure.

Figure 2A:
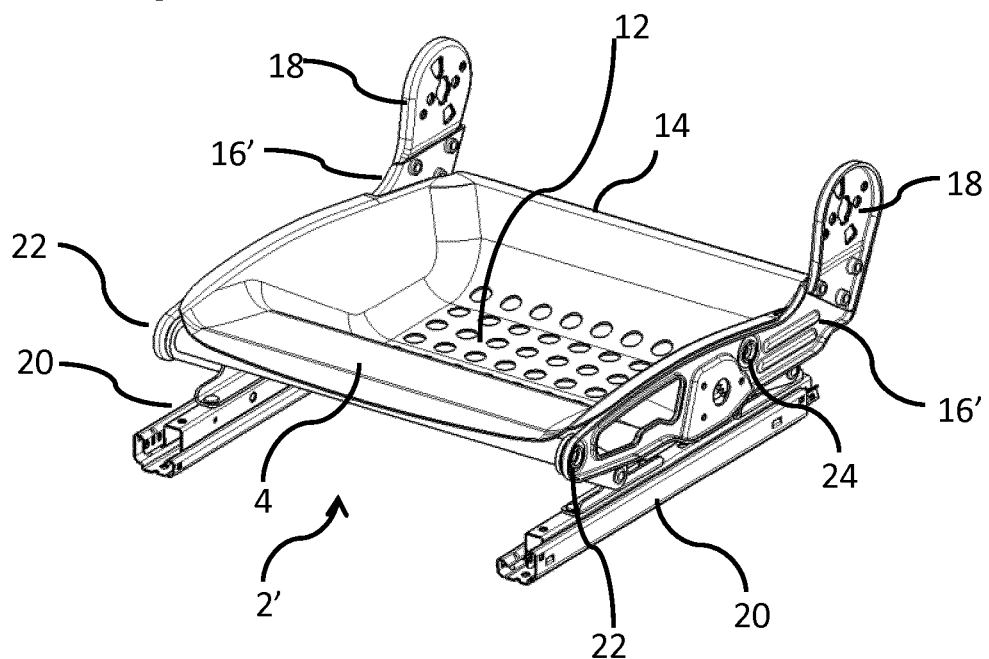
FIG. 2a is a perspective view of a seat base in accordance with the invention having sliding and raise/lower mechanisms.
Figure 2B:
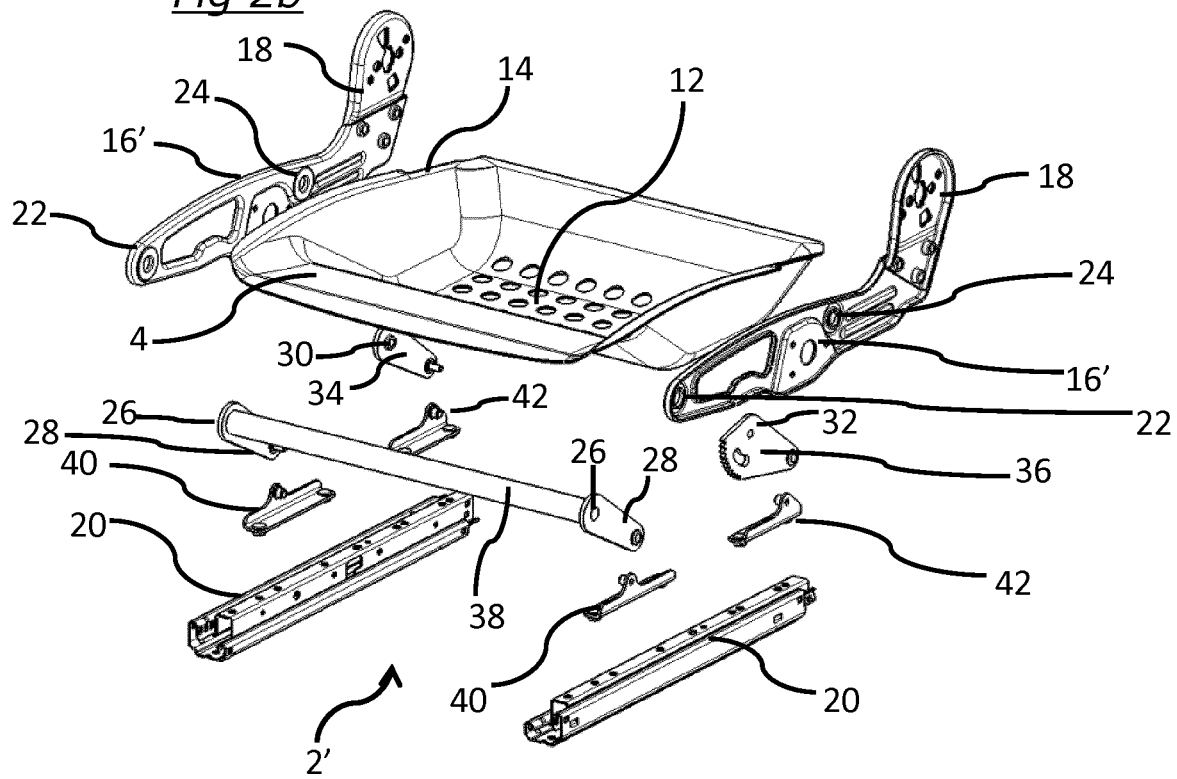
FIG. 2b is an exploded view of this seat base.

FIGS. 2a and 2b show a seat pan 4 for a seat base 2' having a seat height adjustment mechanism which is located between the side plates 16' and the sliding mechanism 20. Side plates 16' have front pivot fixtures 22 and rear pivot fixtures 24 which are adapted to pivotably receive the upper ends 26 of front pivot link arms 28 and the upper ends 30, 32 of rear pivot link arms 34, 36 respectively. The rear pivot arm on one side 36 is the master height adjust link, which engages with a height adjust pump or raise mechanism (not shown) for raising or lowering the seat. The upper ends 26 of front pivot link arms 28 are held in fixed relationship to each other by front support tube 38, whilst the upper ends 30, 32 of rear pivot link arms 34, 36 are held in fixed relationship to each other by being mounted, via the side plates 16', to the seat pan 4. The support tube 38 provides lateral reinforcement. The lower ends of the link arms 28, 34, 36 are pivotally connected to the sliding mechanisms by front and rear brackets 40, 42. This, it will be appreciated, creates a four link arm pivoting mechanism so that when actuated the links pivot together moving the seat pan 4 through an arc so the seat pan 4 is at its highest when the seat pan 4 is moved to the rear and the seat pan 4 is at its lowest when the seat pan 4 is moved forwardly, whilst during this motion the bottom face 12 of the seat pan 4 stays in the same planar relationship relative to the vehicle. The stiffness of the seat pan 4 transfers loads from one side where the height adjust mechanism is located (this mechanism locks the movement of the height adjust link arms, effectively fixing one side of the seat at a set height) to the other unsupported side (where the links are not constrained in any way by the mechanism.) effectively locking the height on the unsupported side through the stiffness of the seat pan itself, and without the need for a rear cross member (used in conventional seat designs). The lack of any rear cross member allows the occupant to sit between the mechanism and frame, in a much lower and more rearward position.

Figure 3:
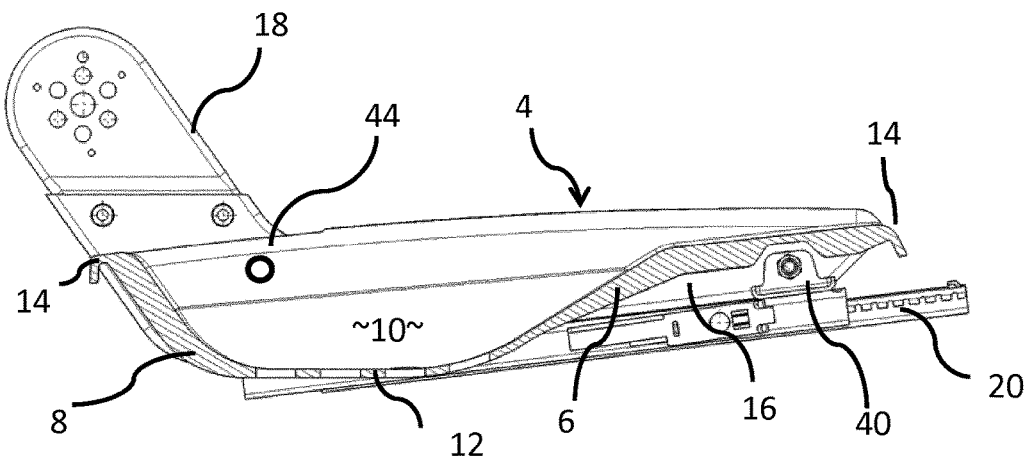
FIG. 3 is a cross sectional side view of the seat pan shown in FIGS. 1 and 2.

The cross-sectional view in FIG. 3 shows the construction of the seat pan 4, the front face 6 extending from the bottom face 12 in two main portions, a first portion which is gently curved upwardly and a second portion which is substantially planar and inclined upwardly at a lesser angle to the horizontal, there being a lateral crease in the seat where the two portions meet; the front face 6 supports the upper thighs of a person occupying the seat, the overall shape and configuration of the front face 6 is such as to prevent 'submarining', which is when a passenger slides forward underneath a restraining seatbelt in the event of an accident. The rear face 8 curves upwardly from the bottom face 12 to the circumferential lip 14 (which is shown extending all around the circumference of the seat pan 4, this is useful for mounting the seat pan 4 to the side plates 16, and for mounting trim, upholstery etc. to the seat pan, but the lip may be interrupted to provide cut-outs for fixtures or other items if required); the rear face supports the upper part of the buttocks and the lower part of the back, whilst the major part of the buttocks is supported by the bottom face 12. Reference numeral 44 in this drawing does not indicate any structural element, but instead indicates where, in a conventional seat pan design, there would need to be a cross member running transversely between the side plates 16 to reinforce or replace the seat base; in the present invention the stiffness of the seat base 2 is sufficient for such a cross member to be omitted. It will be understood that the absence of such a cross member represents a significant advantage, as it allows an occupant of the seat to be seated lower and further back in the seat pan 4. In this embodiment, the side plates 16, 16' are of similar depth as the depth of the seat pan 4, which allows the bottom face 12 of the seat pan 4 to be positioned (when the seat height is adjusted with the seat at its lowest position) very close to the floor of the vehicle, giving a low block height. This is facilitated by the thickness of the bottom face 12 being significantly less than that of the front, rear and side faces 6, 8, 10. In practice, these faces 6, 8, 10 are formed in a sandwich structure, consisting of outer layers of reinforced composite with an inner paper core in a transverse arrangement like a honeycomb, this core being compressed (or omitted) for the bottom face 12, and/or at the circumferential lip 14. The manufacture of composite seat pan 4 is straightforward and therefore relatively inexpensive, as is that of the side plates 16 which can be stamped to shape.

Figure 4A:
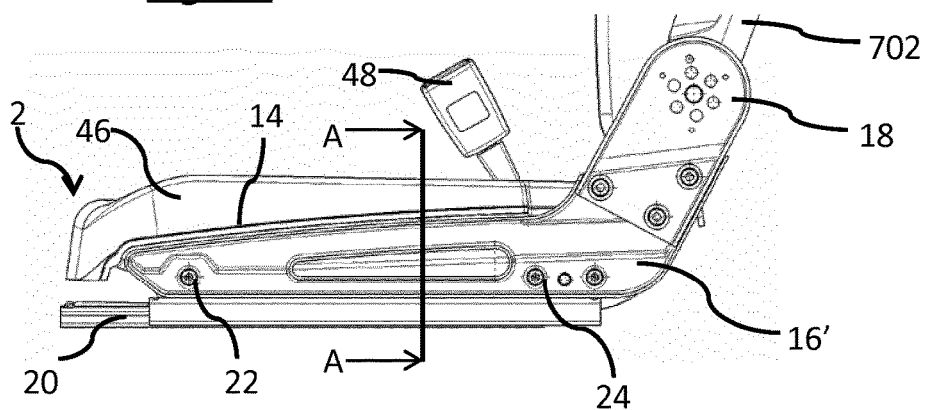
FIG. 4a is a side view of the seat base of FIG. 1a shown as mounted in a vehicle.
Figure 4B:
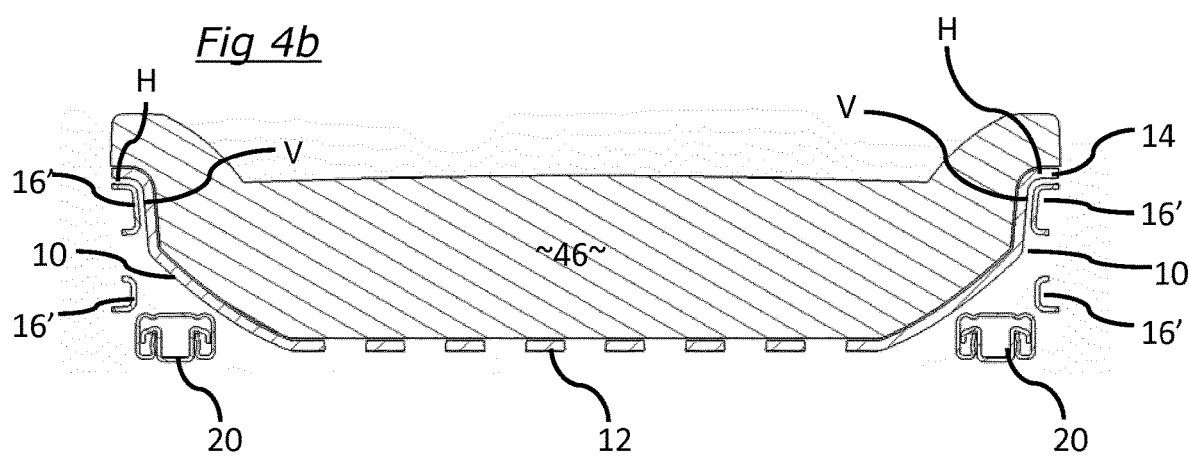
FIG. 4b is a cross-sectional view of the seat base of FIG. 4 seen along lines AA.

FIGS. 4a and 4b show the seat base 2 from the side and in cross-section along line A-A in FIG. 4a respectively. A seat back 702 is shown attached to the extension plate 18; this attachment is capable of pivoting, so that the occupant can change the angle of the seat back 702 as desired. There is also a seat belt attachment 48 for receiving the buckle of a seat belt (not shown), the attachment 48 being fixedly mounted to one side of the seat base 2. As can be seen in FIG. 4b, the lateral sides 10 of the seat pan extend vertically downwardly from the circumferential lip 14 before turning inwardly; this leaves a convenient space for the side plate 16' and the sliding mechanism 20 to fit within, so that they do not extend outside the lateral extent of the circumferential lip. The seat pan 4 is bonded to the upper part of the side plates 16' by an adhesive bond between the two elements, the outer surface of the two being complementarily shaped and configured so that they 'match' closely (details of the complementary shaping of these bonding surfaces and the advantages thereof are described more fully below in connection with the elements which form the seat back). The adhesive extends along a sufficient of the length of the side plates as is needed to provide the required stiffness. The length that is needed will vary according to the design of the seat and the intended loading. In general, it will be better for the adhesive to extend along a substantial proportion of the length of the side plates, such as at least 50%. The outer part of the side face of the seat pan and the upper part of the side plate have a complementarily shaped, substantially vertical portion V and a complementarily shaped, substantially horizontal portion H, and adhesive is applied between either or preferably both of these. The seat pan 4 is shown with cushioning 46 applied, which provides a comfortable seating surface for a passenger.

Figure 5:
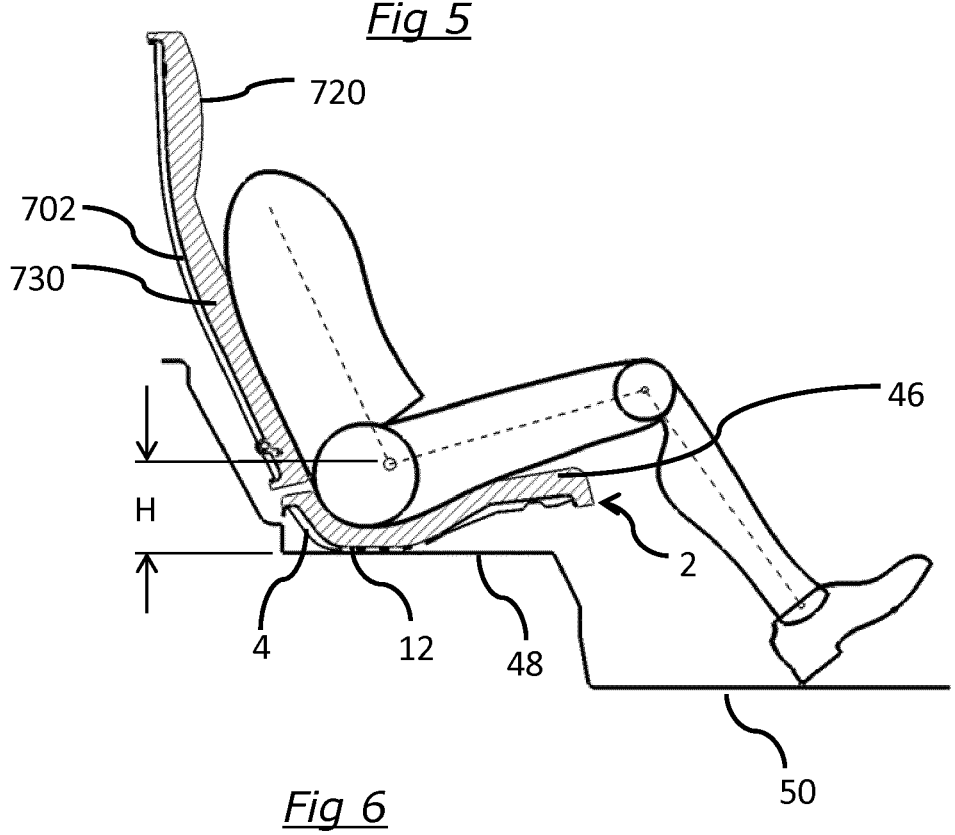
FIG. 5 is a schematic view of a seat having a seat base in accordance with the present invention in use.

FIG. 5 is a schematic view in partial cross-section of a seat comprising a seat base 2 and a seat back 702 (which has a headrest portion 720 and padding 730) in position on the upper floor 50a of a vehicle passenger compartment, illustrating the interrelationship of the seat, upper floor 50a, lower floor 50b and bulkhead 48 and a person occupying the seat. As can be seen, the person's buttocks fit within the concave depression formed by the seat pan 2, relatively far back against the lower extremity of the seat back 702. This puts the person's hip point close to the bottom face 12 of the seat base 2 and allows the bottom face 12 of the seat pan 4 to be very close to or even in contact with the upper floor 50a, minimising the block height H. In seats we have produced according to the invention, the width of the seat is between about 460 mm and about 500 mm, the height of the circumferential edge above the bottom face is between about 80 mm and about 120 mm, the distance between the upper edge of the rear face and the lateral crease in the seat pan is between about 325 mm and about 350 mm, and these dimensions give a block height H of as little as 154 mm, which is very much less than other designs, particularly for such a compact seat. It will be noted that the drawing shows the compression of the cushioning material beneath the passenger due to the passenger's weight unlike the cushioning shown in FIG. 4b, which contributes to the low block height.

The upper floor 50a is positioned so that the position of the seat base 2 relative to the vehicle lower floor 50b allows for the person's lower legs to be at a comfortable angle. Adjustments are available in the vertical and front/rear positions of the seat from the selectively operated sliding and seat height adjust mechanisms 20, 28, 30, 34, 36. The low block height provided by designs in accordance with the invention means that the seat base can be located very close to the upper floor 50a, so that the upper floor 50a beneath the seat base can be raised relative to the lower floor 50b; this creates space beneath the upper floor 50ba which can be used for other purposes in the vehicle (for example for the packaging of a battery pack in an electric vehicle, or services (pipes, hoses, etc.) running beneath the seat), it also allows vehicles to be styled with a lower roof line with same occupant head clearance (because the occupant is seated lower in the vehicle)

Figure 6:
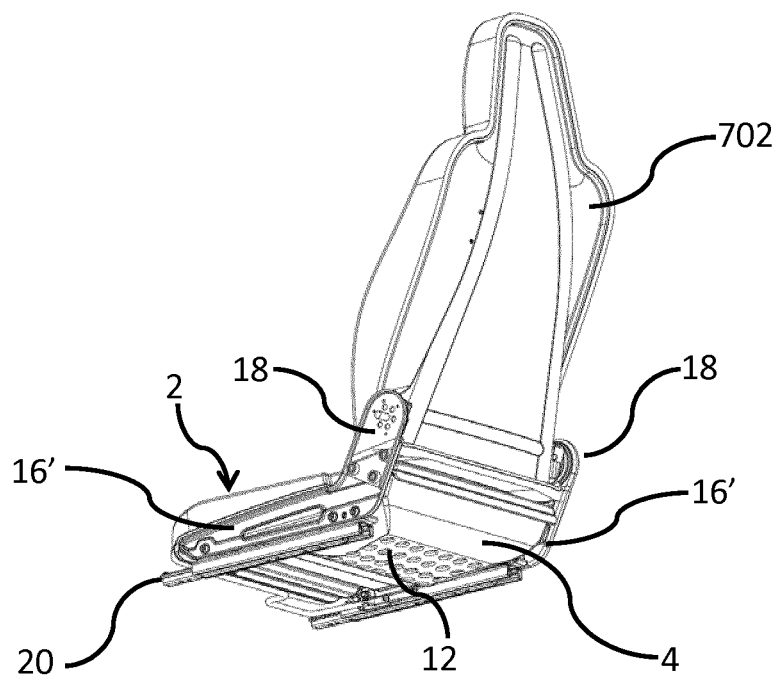
FIG. 6 shows in rear perspective a seat comprising a seat base in accordance with the invention to which is mounted a seat back.

FIG. 6 shows the seat base 2 and seat back 702 from a lower rear perspective, illustrating the interrelationship of these parts; the seat base has side plates 16' and a seat height adjust mechanism, as well as a sliding mechanism 20.

FIG. 7a shows the structure of the seat back 702, looking at the front, concave surface of the seat back which in use would support a person's back; FIG. 7b shows the rear of the same seat back 702, from the convex side. FIG. 8 shows some of the same elements as are illustrated in FIG. 7a, but "exploded". The seat back 702 comprises a shaped composite panel 704, formed of three layers: two outer layers comprising fibre reinforced plastic and a paper honeycomb core. A frame 727 (see FIG. 8) is formed of left and right metal (steel, aluminium or alloy) tubes 706, 708 of circular cross-section which are joined at their upper ends and near their lower ends by upper and lower cross members 710, 712. Upper member 710 is a metal stamping and lower member 712 is a straight rod or tube, the two members being welded to the tubes 706, 708 to form a tapering framework which looks a little like a stretched A-frame; the tubes 706, 708 are curved so that the triangular tapering structure matches the curve of the panel 704. The panel is formed with elongate recesses having curved inner surfaces (best shown in FIG. 8) to receive parts of the frame structure 27. When the frame structure 27 is mounted to the panel 704, tube 706 fits in recess 706r, tube 708 fits in recess 708r, and lower member 712 fits in recess 712r (no recess is shown, or needed, for upper member 710 as this is located away from the panel 704, on the front surfaces of the tubes). The frame is mounted to the panel by bonding the surfaces of the frame which are seated within the recesses, as will be described further below. The panel 704 extends beyond the frame on all sides of the general plane of the frame. The design is simple, and the combination of the panel and framework can be made sufficiently strong such that no cross-bracing between the upper and lower cross members 710, 712 and/or between the left and right tubes 706, 708 of the tapering framework is required.

Metal brackets 722a, 722b are welded to the lower ends of the tubes 706, 708 to provide metallic mounting points for additional metal fixtures 724a, 724b. These are provided to engage with the brackets 722a, 722b via bosses so as to avoid clamping of the composite panel 704 to avoid torque relaxation. These fixtures 724a and 724b provide the hard points at which the seat back 702 is mounted to the seat base.

Other elements which are shown in FIGS. 7a and 7b are: a side airbag 714, which is fitted to the frame structure 727 or panel 4 on one side of the seat back 2 (usually on the outer side of the seat, closest to the vehicle door); a guide 718 to receive and support a seat belt (not shown) where it passes over the edge of the panel 704, the slide being mounted on a metal support arm 716 which is welded to tube 708 and received in recess 716r, and an inertia reel seat belt mechanism 734 mounted to the same tube 708 carrying the support arm 716. The seat belt mechanism 734 can therefore be mounted directly to the seat back 702 without affecting occupant comfort, and the exact location and/or orientation on the tube 708 can be changed easily to suit different requirements, for example where there are space restrictions, where it is not possible to mount the mechanism to the vehicle structure behind the seat, or where there are moving parts to be avoided (such as in a vehicle with a convertible roof).

Figure 9:
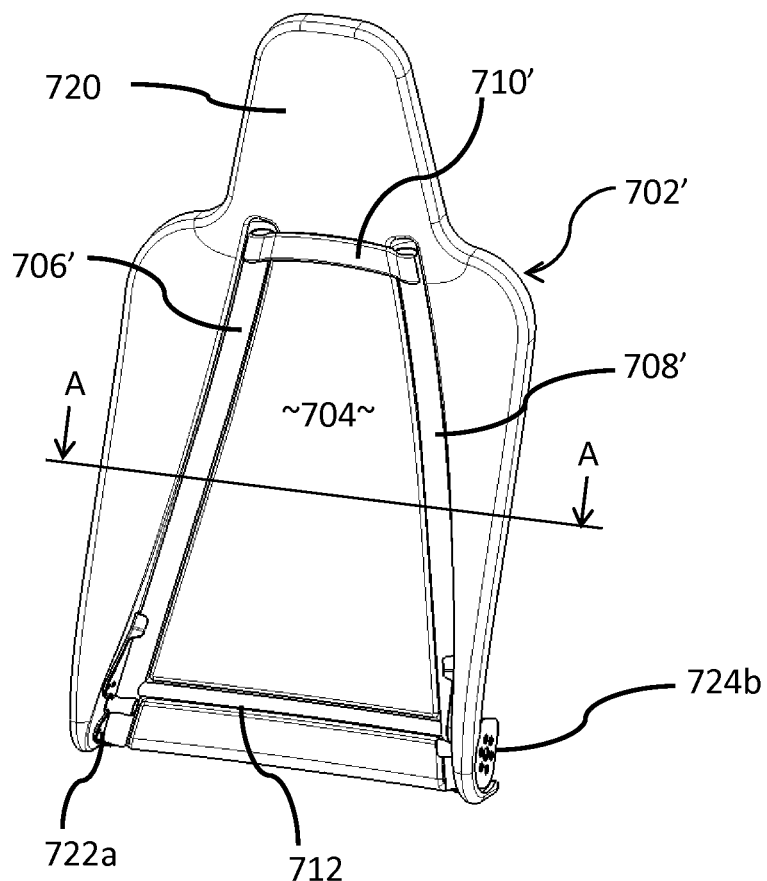

FIG. 9 illustrates that the tubes 706', 708' can be shorter than shown in the previous drawings, so as not to extend into the headrest portion 720 of the seat back (the same for the recesses for the tubes). This reduces the length of the tubes (but requires a slightly longer upper member 710') and so makes the seat back 702' lighter, but the headrest portion can still be capable of resisting head and/or luggage impact loads as regulations require. The fixed headrest portion 720 could be removed to make the upper edge of the seat back lower (e.g. to put it at the level of the arrow denoting reference 702' in the drawing). If a headrest is still required, a headrest could then be provided (not shown), having downwardly extending support arms which could be attached to the upper member 710. If this attachment allowed the support arms to slide relative to the member 710 in the vertical direction, the headrest could be made height adjustable.

Figure 10:
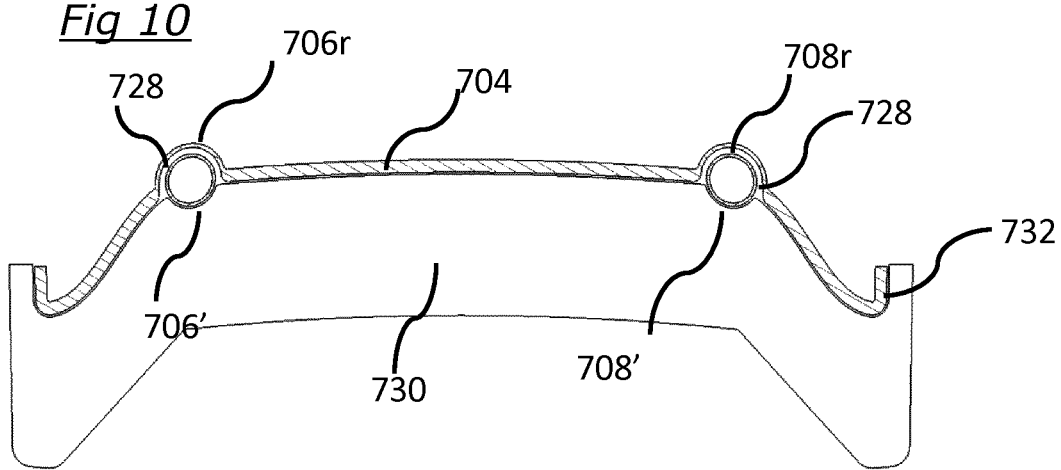
FIG. 10 is a cross-sectional view along lines AA in FIG. 9.

FIG. 10 shows a cross-section along lines AA in FIG. 9. Recesses 706r, 708r are curved in a shape which is complementary to the outer surfaces of the tubes 706', 708', so that the tubes are a snug fit within the recesses, so as to produce a gap or interface between the two of between about 1 mm and about 3 mm; this interface between the recess and the tube is filled with a bonding agent or adhesive 728 to provide a permanent bond between the tubes and the panel 704, and to produce a rigid and strong structure. Insetting the tubes into recesses in the composite panel increases the interface width and hence the available bonding surface, it also provides a bond which, because it is curved rather than planar, resists torsional forces in all directions (a planar bond would be relatively poor at resisting intra-planar forces). We have found that, for circular steel tube of 20 mm diameter, a bond width of about 30 mm is sufficient to provide the necessary strength and rigidity, so the bonding agent need not necessarily extend as far as is shown in the drawing. The extent of the bond 728 can also be changed if the strength of the bonding agent is varied. Those skilled in the art will appreciate that the size and/or cross-sectional shape of the tubes 706', 708' could be increased or reduced, and the complementary size and/or shape of the recesses 706r, 708r varied to match, so as to change the extent by which the recesses protrude from the rear of the panel (thus making the rear of the seat back smoother), and/or the extent by which the tubes protrude from the front of the panel, provided that sufficient bonding is provided to give the necessary structural characteristics. It will be noted that the thickness of the panel 704 at the recesses 706r, 708r is less than the panel thickness elsewhere; this is because the panel is a sandwich structure, consisting of outer layers of reinforced composite with an inner paper core in a transverse arrangement like a honeycomb, the core being compressed where the recesses are formed. This can also be used to make the rear of the seat back smoother by varying the thickness of the core either side of the tubes 6, 8. Also shown in FIG. 10 is a lip 732 extending around the edge of the seat back (similar to the lip 14 around the seat pan 4), which increases the stiffness of the panel 704, and is helpful for mounting trim, or upholstery (not shown), for locating the edge of foam cushioning 730 which covers the tubes 706', 708' and makes the seat back 702 comfortable in use, for helping surround the periphery of the frame structure 727 and cushioning the back of an occupant of the seat from the tubes 706', 708' which are located on the same concave side of the panel as the occupant, and for strengthening the sides of the seat where they protrude forwardly of the general plane of the panel 704 (such as at the sides of the seat back 702 near its base, where the structure can extend further than shown to form bolsters which "wrap around" or partially enclose the outside of an occupant of the seat and provide support when the vehicle is cornering).

Figure 11:
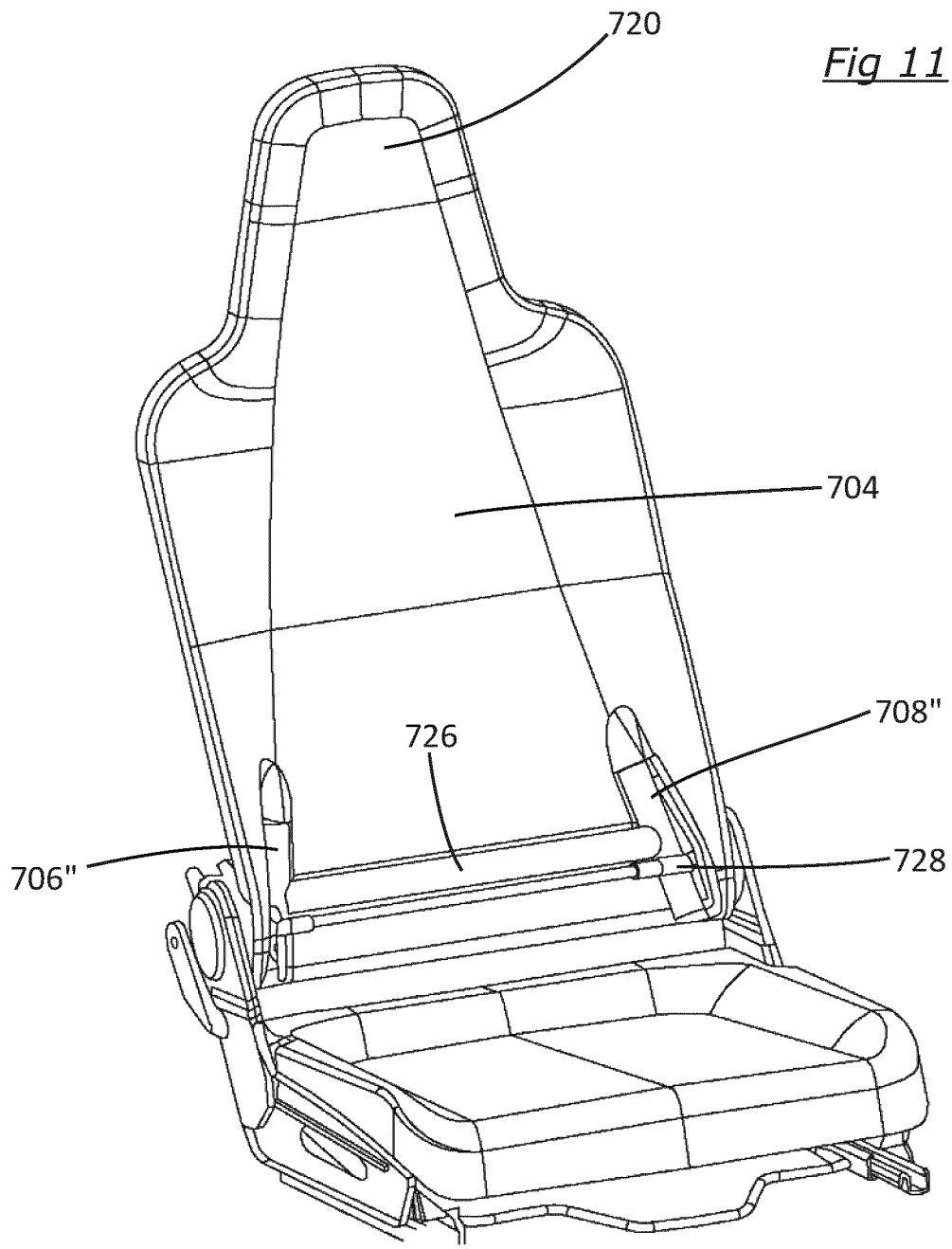
FIG. 11 is a perspective view of a further embodiment of seat back.

FIG. 11 shows an alternative seat back design, suited to some two-seat vehicles (for example), which do not need to meet luggage impact requirements as (depending on the design of the vehicle) there will not be any luggage behind them. The tubes 706", 708" are significantly shorter and extend only a little way into the seat back 704. They are joined by a cross-member 726, in this case approximately halfway up their height. We greatly prefer that the cross-member 726 is above the pivot point 728, however, as it can then provide rigidity to the tubes 706", 708".

Seats designed as described above allow a very simple assembly of parts, which suits mass production methods. The components incorporated into the assembly are simple to manufacture and can be formed in low weight presses without the need for secondary processes, which also suits mass production, and reduces investment cost whilst additionally helping to keep the overall design competitive with traditional seat design methods in terms of component cost. The combination of parts allows the seat design to remain compact both in its width and length (open tool angles and feasible draw depths), whilst being torsionally rigid and strong enough to meet regulatory requirements.

It will of course be understood that many variations may be made to the above-described embodiment without departing from the scope of the present invention. For example, vehicles other than compact cars have a short wheelbase and could benefit from seats as described above. Composite parts could be strengthened in certain areas and/or against directional loads by the use of unidirectional fibres as is known in the art (and as is described in our European patent Nos. EP2445774 B1 and EP2595827 B1, for example). The apertures are shown in the drawings as being equally sized and regularly spaced, but these sizes and/or spacings could be varied to reduce the weight of the seat pan further, provided this does not compromise its structural strength. The relative positions of the sliding and seat height adjust mechanisms as shown could be reversed, so that the height adjust mechanism is mounted directly to the vehicle and the sliding mechanism is located between the height adjust mechanism and the seat base. Provision may be made on the side plates, and/or the extension plates for an isofix mounting. Where different variations or alternative arrangements are described above, it should be understood that embodiments of the invention may incorporate such variations and/or alternatives in any suitable combination.

The invention claimed is:

1. A vehicle seat base comprising a generally concave seat pan and side plates bonded to the seat pan for mounting the seat pan to the vehicle wherein the seat pan is formed of a composite material and has, relative to the direction of movement of the vehicle, a front face, a rear face, two lateral side faces and a bottom face, and wherein the side plates extend from the front towards the rear of the seat pan and the bond extends along at least part of the length of each of the side plates and wherein the front face, rear face and two lateral side faces all extend generally downwardly towards a bottom face, the front, rear and lateral side faces being at least in part planar and at least in part tapering inwardly and being configured when in use to receive and support together with the bottom face at least a part of the buttocks or the thighs of a person sitting on the seat, the upper edges of the front, rear and lateral side faces together defining a circumferential lip of the seat pan which extends around the circumference of the seat pan.

2. The vehicle seat base according to claim 1, wherein each side plate includes at least one fixture for a pivoting link of a height adjust mechanism, and wherein the rear, front and side faces extend so that in use substantially all of the circumferential lip is vertically above the fixtures and the bottom face is vertically below the fixtures.

3. The vehicle seat base according to claim 2 comprising the height adjust mechanism mounted to the at least one fixture and further mountable directly or indirectly to the vehicle, for selectively adjusting the height of the seat base relative to the vehicle, the height adjust mechanism comprising a four link pivoting mechanism arranged to swing the seat base between first and second positions, the first position being forwards and lower relative to the second position.

4. The vehicle seat base according to claim 1, wherein there are fixtures on each side plate for mounting the side plates directly or indirectly to the vehicle and located forwardly of and the same distance from the rear face of the seat pan, and between the rear face of the seat pan and the front face of the seat pan, and wherein the space within the seat pan extending directly between the said fixtures is in use substantially unobstructed by any seat structure.

5. The vehicle seat base according to claim 1, wherein the side plates are bonded to the seat pan along at least 50% of their length.

6. The vehicle seat base according to claim 1, wherein the seat pan is a unitary item.

7. The vehicle seat base according to claim 1, wherein the thickness of the rear, front and side faces is greater than the thickness of the bottom face.

8. The vehicle seat base according to claim 1, wherein there are apertures formed in the bottom face.

9. The vehicle seat base according to claim 1 comprising cushioning material within the seat pan, covering the front, rear, side and bottom faces.

10. The vehicle seat base according to claim 1 comprising a mechanism mounted to the side plates for mounting directly or indirectly to the vehicle for selectively adjusting the height of the seat base relative to the vehicle.

11. The vehicle seat base according to claim 10, wherein the mechanism comprises a four link pivoting mechanism arranged to swing the seat base between first and second positions, the first position being forwards and lower relative to the second position.

12. The vehicle seat base according to claim 11, wherein the four link mechanism is pivotally mounted to two fixtures along the side plates, one towards the front and a second toward the rear of the side plate, wherein the second fixture is forward of the rear face of the seat pan, and wherein the space within the seat pan extending directly between the said fixtures is substantially unobstructed by any seat structure.

13. The vehicle seat base according to claim 1, wherein the seat pan comprises a first layer, a second, core layer and a third layer.

14. The vehicle seat base according to claim 1, wherein the side plates are adapted to provide mounting points for a seat back.

* * * * *